Oct. 7, 1930.  J. W. BRYCE  1,777,873
WEIGHING SCALE
Filed March 22, 1928  2 Sheets-Sheet 1

Inventor
JAMES W. BRYCE
By his Attorney

Oct. 7, 1930.  J. W. BRYCE  1,777,873
WEIGHING SCALE
Filed March 22, 1928  2 Sheets-Sheet 2

Inventor
JAMES W. BRYCE
By his Attorney

Patented Oct. 7, 1930

1,777,873

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

WEIGHING SCALE

Original application filed June 22, 1927, Serial No. 200,531. Divided and this application filed March 29, 1928. Serial No. 263,612.

This case is a division of application No. 200,531, filed June 22, 1927.

The present invention concerns improvements in the construction of tare devices for scales.

More specifically, the object of this invention is to provide an improved construction for attaching tare beams to a scale.

Other objects and advantages will be apparent from the appended specification and claims and shown in the drawing, wherein;

Figure 1:
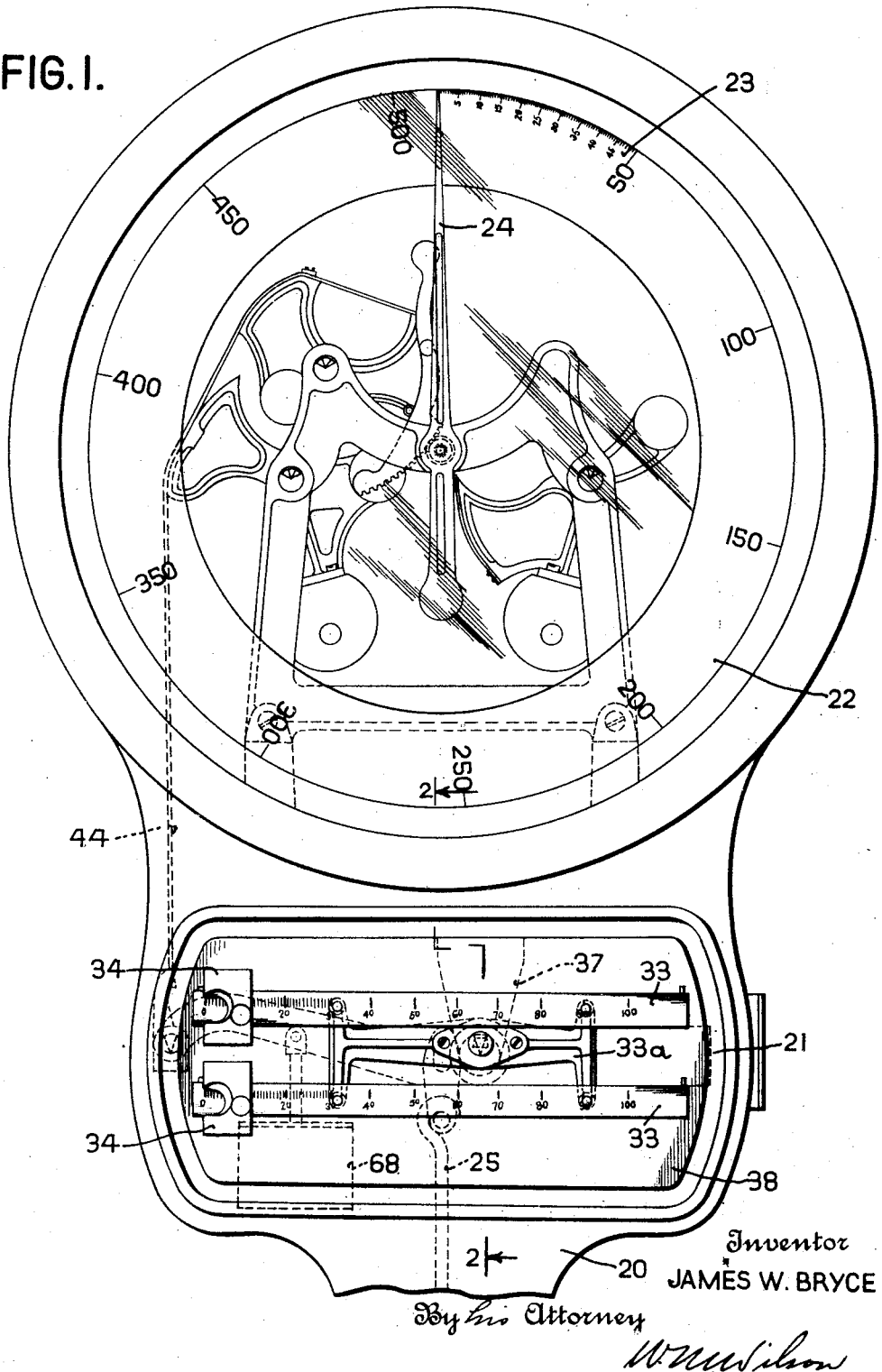
Fig. 1 is an elevation of the upper part of the scale standard which is formed into a casing for the load offsetting mechanism and a corresponding casing for the scale beam mechanism.
Figure 3:
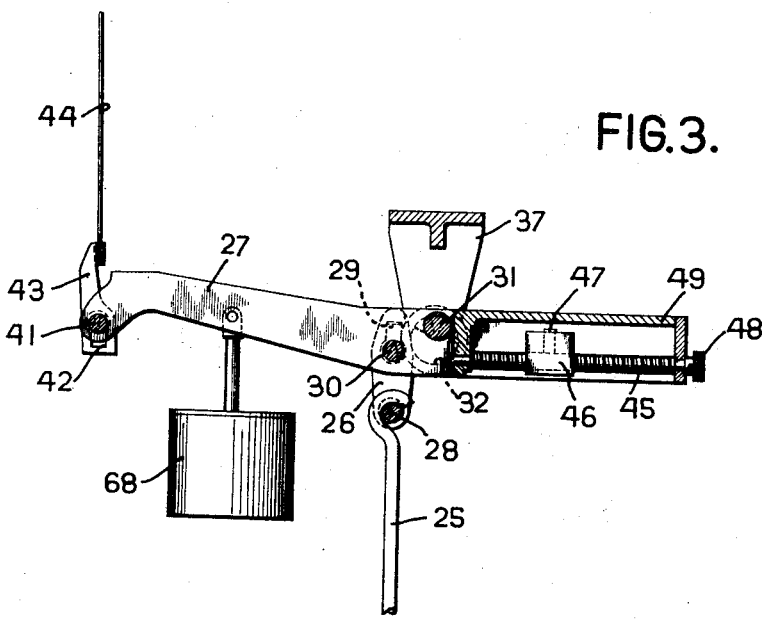
Fig. 3 is a detail showing the scale beam removed from the casing.
Figure 2:
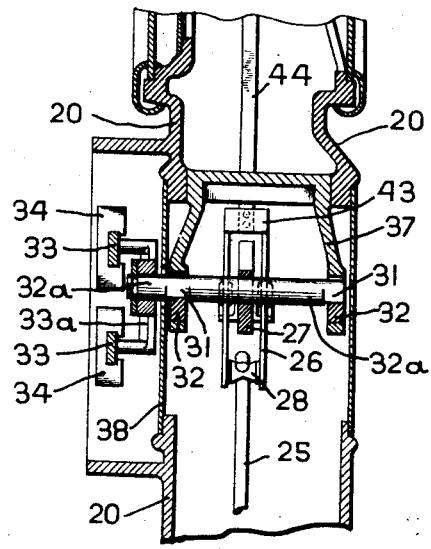
Fig. 2 is a section on line 2—2 of Fig. 1.

The scale illustrated in Figs. 1 to 3 is of the heavy capacity type and is adapted to be mounted on a suitable truck provided with wheels to enable it to be freely moved about. As usual in such scales the main levers may be enclosed in the truck or base portion with the platform forming a top covering therefor and operatively connected with the main levers to cause displacement of them during weighing operations. This mechanism is well known and has not been illustrated in the drawing. At one end of the base the hollow standard or column illustrated in fragmentary form at 20 in Figs. 1 and 2 is supported and is provided with two enlargements indicated generally at 21 and 22 of which the former encloses the scale beam with its associated mechanism and the latter forms a casing for the load offsetting mechanism and supports the scale dial 23 with which the index arm 24 coacts. The main levers of the scale may be connected by means well known in the art with the steelyard 25 whose upper end is formed into a hook and engages a shackle 26 supported by the scale beam 27 to displace the latter in proportion to the displacement of the main levers.

The shackle 26 consists of two side plates jointed by a short rod 28 with which the hook end of the steelyard engages and each side plate is provided with an aperture in each of which is lodged a bearing 29 to form a seat for the knife edges 30 fastened to opposite sides of the scale beam. The scale beam is fulcrumed on knife edges 31 on opposite sides thereof which seat in bearings 32 placed on the downwardly extending arms of a yoke 37 supported by the standard 20. The knife edges 31 are formed in a shaft 32ª which extends through the beam and is rigidly fastened thereto and of which the portion extending toward the front of the standard projects through an opening therein and carries a diverging bracket 33ª (Fig. 1) which in turn carries the tare beams 33 at its ends thus making the tare poiser 34 accessible from the outside of the scale casing. The opening in the standard is covered by a plate 38 perforated to permit the passage of the shaft 32ª therethrough, thus providing a dust-proof arrangement for connecting the tare beams to the scale beam. The scale beam 27 is a lever of the second order and its nose carries a knife edge 41 seated in a bearing 42 supported by a yoke 43 which is attached to the tape 44. The tape 44 in this case forms the single connecting link between the scale beam and the load offsetting mechanism. The rear portion of the scale beam 27 is provided with a small casing 49 longitudinally of which extends a feed screw 45 for moving the zero adjusting weight 46. This weight is drilled to slide on the feed screw and is tapped to accommodate a screw 47 which may press a small piece of leather or other soft material against the screw threads, whereupon, as the weight is prevented from turning by the sides of the casing, turning of the feed screw causes the weight to move longitudinally thereof. A knurled button 48 on the end of the feed screw permits adjustment of the weight 46 when desired. The oscillations of the scale beam 27 in response to changes of load on the scale platform are suitably damped by a dash pot 68.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim:

1. In a weighing scale, a scale beam, a casing enveloping said beam, a rod fixed to said beam extending substantially at right angles thereto and provided with supporting knife edges, said rod having a portion extending exteriorly of said casing, a tare beam fixed to said extending portion exteriorly of the casing and an auxiliary casing partially enveloping said tare beam.

2. In a weighing scale, a scale beam, a casing enveloping said beam, a rod fixed to said beam extending substantially at right angles thereto and provided with supporting knife edges, said rod having a portion extending exteriorly of said casing, a tare beam fixed to said extending portion exteriorly of the casing and a protecting flange extending exteriorly of the casing in juxtaposition to the tare beam.

3. In a weighing scale, a scale beam, a casing enveloping said beam, a tare beam exterior to said casing and operatively connected to said scale beam at a single point thereof and an exteriorly extending protecting flange on said casing in juxtaposition to the tare beam.

In testimony whereof I hereto affix my signature.

JAMES W. BRYCE.